United States Patent
Liu et al.

(10) Patent No.: US 11,854,055 B2
(45) Date of Patent: Dec. 26, 2023

(54) METHODS AND APPARATUS FOR ANOMALY DETECTIONS

(71) Applicant: Walmart Apollo, LLC, Bentonville, AR (US)

(72) Inventors: Lian Liu, Santa Clara, CA (US); Hui-Min Chen, Pleasanton, CA (US); Sangita Fatnani, Cupertino, CA (US); Premalatha Thangamani, Fremont, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 291 days.

(21) Appl. No.: 17/521,029

(22) Filed: Nov. 8, 2021

(65) Prior Publication Data
US 2022/0058705 A1    Feb. 24, 2022

Related U.S. Application Data

(63) Continuation of application No. 16/259,997, filed on Jan. 28, 2019, now Pat. No. 11,200,607.

(51) Int. Cl.
*G06Q 30/00* (2023.01)
*G06Q 30/0601* (2023.01)
(Continued)

(52) U.S. Cl.
CPC ....... *G06Q 30/0605* (2013.01); *G06F 16/244* (2019.01); *G06F 16/2462* (2019.01);
(Continued)

(58) Field of Classification Search
None
See application file for complete search history.

(56) References Cited

U.S. PATENT DOCUMENTS 7,310,590 B1  12/2007  Bansal
8,103,568 B1   1/2012  Yeung et al.
(Continued)

OTHER PUBLICATIONS

Iman Vasheghani Farahani et al. "Time series anomaly detection from a Markov chain perspective" 2019 18th IEEE International Conference on Machine Learning and Applications (ICMLA) (Year: 2019).
(Continued)

*Primary Examiner* — Naeem U Haq
(74) *Attorney, Agent, or Firm* — Morgan, Lewis & Bockius LLP; Manita Rawat

(57) ABSTRACT

This application relates to apparatus and methods for identifying anomalies within a time series. In some examples, a computing device receives sales data identifying a sale of at least one item, and aggregates the received data in a database. The computing device may generate a plurality of time series based on the aggregated sales data. The computing device may extract features from the plurality of time series, and generate an alerting algorithm that is based on clusters of the extracted features. The computing device may apply the alerting algorithm to a time series generated from received sales data to determine whether the time series is an anomaly. Based on the determination, the computing device may generate and transmit anomaly data identifying whether the time series is an anomaly, such as to another computing device.

20 Claims, 8 Drawing Sheets

(51) Int. Cl.
*G06F 17/16* (2006.01)
*G06F 16/2458* (2019.01)
*G06F 16/242* (2019.01)
*G06N 7/01* (2023.01)

(52) U.S. Cl.
CPC ............... *G06F 17/16* (2013.01); *G06N 7/01* (2023.01); *G06Q 30/0635* (2013.01)

(56) References Cited

U.S. PATENT DOCUMENTS

| | | | |
|---|---|---|---|
| 8,554,699 | B2 | 10/2013 | Ruhl et al. |
| 8,856,923 | B1 | 10/2014 | Kolman et al. |
| 8,862,526 | B2 | 10/2014 | Miltonberger |
| 9,633,201 | B1 | 4/2017 | Katz |
| 9,965,527 | B2 | 5/2018 | Bullotta et al. |
| 9,985,979 | B2 * | 5/2018 | Pegna ................... H04L 67/535 |
| 10,242,540 | B2 | 3/2019 | Chen et al. |
| 10,482,466 | B1 | 11/2019 | Walters et al. |
| 10,977,569 | B2 | 4/2021 | Pang |
| 2002/0133721 | A1 | 9/2002 | Adjaoute |
| 2007/0106582 | A1 | 5/2007 | Baker et al. |
| 2007/0294271 | A1 | 12/2007 | Bammi et al. |
| 2008/0109392 | A1 | 5/2008 | Nandy |
| 2010/0004976 | A1 | 1/2010 | Faure et al. |
| 2011/0055074 | A1 | 3/2011 | Chen et al. |
| 2011/0238564 | A1 | 9/2011 | Lim et al. |
| 2014/0081699 | A1 | 3/2014 | Bammi et al. |
| 2015/0356421 | A1 | 12/2015 | Jones et al. |
| 2016/0062950 | A1 | 3/2016 | Brodersen et al. |
| 2017/0364803 | A1 | 12/2017 | Calmon et al. |
| 2018/0219889 | A1 | 8/2018 | Oliner et al. |
| 2019/0188722 | A1 | 6/2019 | Allbright et al. |
| 2019/0295085 | A1 | 9/2019 | Ashiya et al. |
| 2019/0295086 | A1 | 9/2019 | Ashiya et al. |
| 2019/0370610 | A1 | 12/2019 | Batokukov et al. |
| 2019/0379589 | A1 | 12/2019 | Ryan et al. |
| 2020/0005096 | A1 | 1/2020 | Calmon et al. |
| 2020/0057981 | A1 | 2/2020 | Partin et al. |
| 2020/0065813 | A1 | 2/2020 | Walters et al. |
| 2020/0116522 | A1 | 4/2020 | Paul |
| 2020/0249406 | A1 | 9/2020 | Ghosh et al. |
| 2020/0380335 | A1 | 12/2020 | Neznal |
| 2020/0380409 | A1 | 12/2020 | Seo et al. |

OTHER PUBLICATIONS

Abhimanyu Roy, "Deep Learning Detecting Fraud in Credit Card Transactions" © 2018 IEEE (Year: 2018.

* cited by examiner

METHODS AND APPARATUS FOR ANOMALY DETECTIONS

CROSS-REFERENCE TO RELATED APPLICATIONS

This patent application is a continuation application of, and claims priority to, U.S. patent application Ser. No. 16/259,997, filed Jan. 28, 2019 and entitled "METHODS AND APPARATUS FOR ANOMALY DETECTIONS," the entire contents of which are incorporated herein by reference.

TECHNICAL FIELD

The disclosure relates generally to anomaly detection and, more specifically, to identifying fraudulent retail activities.

BACKGROUND

Some transactions, such as some retail transactions, are fraudulent. For example, a customer may attempt to buy an item from a retailer's website using a stolen credit card. Because the owner of the credit card has not consented to the purchase, the transaction is fraudulent. Another example may be during an account take over, where a fraudster has hacked an online account and has used a credit card stored in the account to make a purchase. As another example, a customer may attempt to return an item to a retailer, where the item was purchased from a different store. In some cases, a customer may present another's identification (ID) card (e.g., driver's license) when attempting to return an item. In some cases, a customer may buy and use an item, and may attempt to return the item when the person no longer has a need for the item. In each of these examples, the customer is involved in a fraudulent activity.

Fraudulent activities may cause financial harm to a company, such as a retailer. For example, the company may incur expense associated with not receiving payment for the item for an unauthorized purchase made with a credit card. As another example, a company may incur expense in accepting an item for return, and returning payment for the item, when the item was originally purchased from a different retailer. The company may also incur expenses related to inventorying and stocking a returned item, attempting to resell the item, returning the item to a manufacturer, or disposing the item. As such, a retailer may benefit from identifying fraudulent transactions.

SUMMARY

The embodiments described herein are directed to automatically identifying anomalies, such as fraudulent transactions. The embodiments may identify a fraudulent activity as it is taking place, for example, allowing a retailer to stop or not allow the transaction. The embodiments may allow a retailer to more closely scrutinize the transaction to determine if fraud is indeed involved. In some examples, the embodiments may allow a retailer to determine fraudulent transactions that have already taken place, allowing the retailer to identify one or more individuals associated with the fraudulent transactions. As a result, the embodiments may allow a retailer to decrease expenses related to fraudulent transactions, among other advantages recognized by those of ordinary skill in the art having the benefit of these disclosures.

In accordance with various embodiments, exemplary systems may be implemented in any suitable hardware or hardware and software, such as in any suitable computing device. For example, in some embodiments, a computing device is configured to receive sales data identifying a sale of at least one item. For example, the sales data may be received from a computing device located at a store when a customer purchases an item. The computing device may be configured to generate at least one time series based on the received sales data. The computing device may also be configured to obtain alerting algorithm data identifying an alerting algorithm that is based on clusters of feature data, and apply the alerting algorithm to the at least one time series. The computing device may be configured to determine whether the at least one time series is an anomaly (e.g., fraudulent transaction) based on the application of the alerting algorithm. The computing device may also be configured to generate anomaly data identifying whether the at least one time series is an anomaly based on the determination. The computing device may be configured to transmit, in response to the received sales data, the anomaly data identifying whether the at least one time series is an anomaly. For example, the computing device may transmit the anomaly data to the computing device located at the store.

In some examples, the computing device is configured to generate the alerting algorithm based on aggregated data.

In some embodiments, a method is provided that includes receiving sales data identifying a sale of at least one item, and generating at least one time series based on the received sales data. The method may also include obtaining alerting algorithm data identifying an alerting algorithm that is based on clusters of feature data, and applying the alerting algorithm to the at least one time series. The method may further include determining whether the at least one time series is an anomaly based on the application of the alerting algorithm. The method may include generating, based on the determination, anomaly data identifying whether the at least one time series is an anomaly. The method may also include transmitting, in response to the received sales data, the anomaly data identifying whether the at least one time series is an anomaly.

In some examples, a method may include generating the alerting algorithm based on aggregated data.

In yet other embodiments, a non-transitory computer readable medium has instructions stored thereon, where the instructions, when executed by at least one processor, cause a computing device to perform operations that include receiving sales data identifying a sale of at least one item, and generating at least one time series based on the received sales data. The operations may also include obtaining alerting algorithm data identifying an alerting algorithm that is based on clusters of feature data, and applying the alerting algorithm to the at least one time series. The operations may further include determining whether the at least one time series is an anomaly based on the application of the alerting algorithm. The operations may include generating, based on the determination, anomaly data identifying whether the at least one time series is an anomaly. The operations may also include transmitting, in response to the received sales data, the anomaly data identifying whether the at least one time series is an anomaly.

In some examples, a non-transitory computer readable medium has instructions stored thereon, where the instructions, when executed by at least one processor, cause a computing device to perform operations that include generating the alerting algorithm based on aggregated data.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
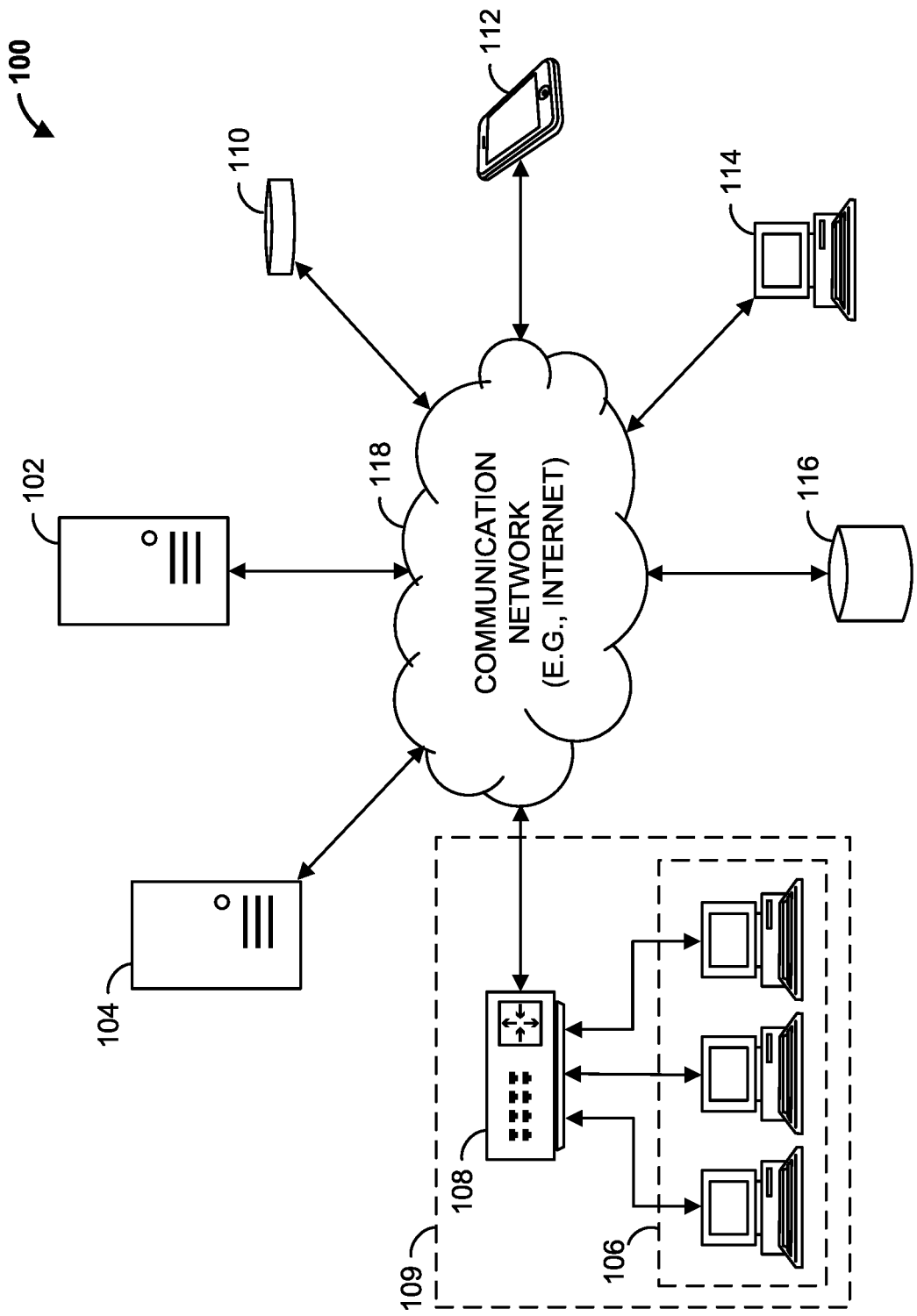
FIG. 1 is a block diagram of a fraud detection system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a fraud detection system 100 that includes a fraud detection computing device 102 (e.g., a server, such as an application server), a server 104 (e.g., a web server), workstation(s) 106, database 116, and multiple customer computing devices 110, 112, 114 operatively coupled over network 118. Fraud detection computing device 102, workstation(s) 106, server 104, and multiple customer computing devices 110, 112, 114 can each be any suitable computing device that includes any hardware or hardware and software combination for processing and handling information. In addition, each can transmit data to, and receive data from, communication network 118.

For example, fraud detection computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of fraud detection computing device 102, server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, fraud detection system 100 can include any number of customer computing devices 110, 112, 114. Similarly, fraud detection system 100 can include any number of workstation(s) 106, fraud detection computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with fraud detection computing device 102 over communication network 118. The workstation(s) 106 may send data to, and receive data from, fraud detection computing device 102. For example, the workstation(s) 106 may transmit data related to a return, such as the return of an item, to fraud detection computing device 102. In response, fraud detection computing device 102 may transmit an indication of whether the return of the item is suspected of being fraudulent. Workstation(s) 106 may also communicate with server 104. For example, server 104 may be a web server and host one or more web pages, such as a retailer's website. Workstation(s) 106 may be operable to access and program (e.g., configure) the webpages hosted by server 104.

Fraud detection computing device 102 is operable to communicate with database 116 over communication network 118. For example, fraud detection computing device 102 can store data to, and read data from, database 116. Database 116 can be a remote storage device, such as a cloud-based server, a memory device on another application server, a networked computer, or any other suitable remote storage. Although shown remote to fraud detection computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items.

In some examples, the web page may be operated by a retailer and allow for the initiation of the return of an item. For example, an operator of one of multiple computing devices 110, 112, 114 may submit information on the web page to return an item. In these examples, web server 104 may transmit data that identifies the attempted return to fraud detection computing device 102. In response, fraud detection computing device 102 may transmit an indication of whether the attempted return is suspected of being fraudulent. The customer may complete the return of the item by dropping the item off at a retail location of the retailer. In some examples, the customer may complete the return of the item by mailing the item to the retailer.

Fraud detection system 100 may allow for the identification of activities that may be fraudulent. For example, fraud detection system 100 may identify an attempted in-store return of an item as fraudulent. Fraud detection system 100 may also identify online initiated returns as fraudulent. In some examples, fraud detection system 100 may identify completed returns as fraudulent (e.g., the item has been returned to a retailer and the customer has received payment for the returned item).

In some examples, fraud detection system 100 generates a plurality of time series based on sales data. For example, database 116 may store sales data related to the online, or in-store, sale of items. Fraud detection computing device 102 may generate a time series identifying values of the sales data periodically over a period of time (e.g., monthly over a period of a year, weekly over a period of a year, etc.). For example, each time series may be a sequence of numbers indexed by time, such as indicated in the equation below:

$$s = (s_{t_1}, \ldots, s_{t_n}),\qquad\text{eq. (1)}$$

where $t_1, \ldots t_n$ are timestamps

In some examples, the length of time between two consecutive timestamps are equal, such as identified by the equation below:

$$t_{i+1} - t_i = t_{j+1} - t_j \text{ for all } 1 \leq i < j \leq n-1\qquad\text{eq. (2)}$$

As such, to simply the notation $s_i$ may be used instead of $s_{t_i}$ for all $1 \leq i \leq n$, such as:

$$s = (s_1, \ldots, s_n)\qquad\text{eq. (3)}$$

The value of each $s_i$ in time series $s = (s_1, \ldots, s_n)$ may be the sum of m contributors. That is:

$$s_i = \sum_{j=1}^{m} x_{j,i} \text{ for all } 1 \leq i \leq n \qquad\text{eq. 4}$$

Then for each $1 \leq j \leq m$, the sequence $x_j = (x_{j,1}, \ldots, x_{j,n})$ can be regarded as a time series with the same time range as s. A time series bundle may include a set of time series $X = \{x_1, \ldots, x_m\}$. For example, a retailer's daily sales amount may be represented as a time series, which each time series represents sales with a particular credit card number. That is, the daily sales amount associated with each credit card is an individual contributor to the total sales for that day. As such, the daily sales amount for all credit cards, as represented by time series, may form a time series bundle.

Based on the time series bundle, fraud detection system 100 may detect whether each time series associated with each credit card is associated with abnormal shopping behavior (e.g., possible fraudulent activity). For example, fraud detection computing device 102 may detect whether a time series is associated with sharp increases in shopping amount. In some examples, each time series represents a total sales amount from an individual IP address, a shipping address, or any other suitable representation. In some examples, the time series are based on more than one attribute. For example, each time series may be based on a pair of values, such as time series for each credit card number and product category. In this example, fraud detection computing device 102 may monitor whether each credit card has an abnormal increase/decrease in shopping amount in each product category.

To detect anomalies, fraud detection computing device 102 may generate data that identifies and characterizes clusters of feature data. The generation of the clusters may include three steps: sampling, feature extraction and standardization, and clustering.

Sampling

For a training data set $X = \{x_1, \ldots, x_m\}$, where each $x_j = (x_{j,1}, \ldots, x_{j,n})$ is a time series with n timestamps, fraud detection computing device 102 generates a model hyperparameter, d, which may be an integer such that $0 \leq d \leq n$. The hyperparameter d may identify the number of timestamps to "look back" to determine whether an anomaly exists. The goal of the sampling step is to collect a set of segments of length d from the time series uniformly at random (e.g., with replacement). Given N, the number of training segments to sample (e.g., 1 million), an algorithm, such as the sampling algorithm shown below, may be employed to sample a training data set to generate a sampled training set D.

1. let D = { };
2. for k = 1, ..., N:
3. Choose j uniformly at random from {1, ..., m};
4. Choose i uniformly at random from {1, ..., n−d};
5. Add the segment $(x_{j,i}, x_{j,i+1}, \ldots, x_{j,i+d-1})$ to D;
6. return D.

Feature Extraction and Standardization

Given the sampled training set D generated during the sampling step, fraud detection computing device 102 generates features for each segment of D. For example, given a segment $z = (z_0, \ldots, z_d)$ in D, fraud detection computing device 102 may compute the following features:

$$z_d \qquad\text{eq. (5)}$$

$$z_d - z_j \text{ for } 0 \leq j \leq d-1 \qquad\text{eq. (6)}$$

$$\partial^j z_d \text{ for } 2 \leq j \leq d, \text{ where } \partial^0 z_d = z_d \text{ and } \partial^j z_d = \partial^{j-1} z_d - \partial^{j-1} z_{d-1} \qquad\text{eq. (7)}$$

For example, suppose fraud detection computing device 102 generates a segment $z = (2, 5, 0, 7, 3)$ with d = 4. Based on the execution of equations (5) through (7), the following features may be identified:

$\partial^0 z_4 = z_4 = 3$,
$\partial^0 z_3 = z_3 = 7$,
$\partial^0 z_2 = z_2 = 0$,
$\partial^0 z_1 = z_1 = 5$,
$\partial^0 z_0 = z_0 = 2$;
$z_4 - z_3 = 3 - 7 = -4$,
$z_4 - z_2 = 3 - 0 = 3$,
$z_4 - z_1 = 3 - 5 = -2$,
$z_4 - z_0 = 3 - 2 = 1$;

$\partial^1 z_4 = \partial^0 z_4 - \partial^0 z_3 = z_4 - z_3 = -4$,
$\partial_1 z_3 = \partial^0 z_3 - \partial^0 z_2 = z_3 - z_2 = 7$,
$\partial^1 z_2 = \partial_0 z_2 - \partial^0 z_1 = z_2 - z_1 = -5$,
$\partial_1 z_1 = \partial_0 z_1 - \partial^0 z_0 = z_1 - z_0 = 3$;
$\partial^2 z_4 = \partial^1 z_4 - \partial^1 z_3 = -4 - 7 = -11$,
$\partial^2 z_3 = \partial^1 z_3 - \partial^1 z_2 = 7 - (-5) = 12$,
$\partial^2 z_2 = \partial^1 z_2 - \partial^1 z_1 = -5 - 3 = -8$;
$\partial^3 z_4 = \partial^2 z_4 - \partial^2 z_3 = -11 - 12 = -23$,
$\partial^3 z_3 = \partial^2 z_3 - \partial^2 z_2 = 12 - (-8) = 20$;
$\partial^4 z_4 = \partial^3 z_4 - \partial^3 z_3 = -23 - 20 = -43$.

Fraud detection computing device 102 may then generate a features vector that includes the determined (e.g., derived) features. In other words, fraud detection computing device 102 maps each segment z to a 2d-dimensional feature space. For example, in the example from just above, fraud detection computing device 102 may generate the 8-dimensional features vector $(z_4, z_4-z_3, z_4-z_2, z_4-z_1, z_4-z_0, \partial^2 z_4, \partial^3 z_4, \partial^4 z_4) = (3, -4, 3, -2, 1, -11, -23, -43)$.

Fraud detection computing device 102 may then standardize the features by, for example, removing the mean and dividing by the standard deviation. For example, assume for a segment $z_i$ that its features are defined as $(z_{i,1}, z_{i,2d})$. Then for all $1 \leq i \leq D$ and all $1 \leq j \leq 2d$, Fraud detection computing device 102 computes:

$$\tilde{z}_{i,j} = (z_{i,j} - \mu_j)/\sigma_j \quad \text{eq. (8)}$$

where:

$$\mu_j = \frac{1}{D} \sum_{i=1}^{D} z_{i,j}; \text{ and} \quad \text{eq. (9)}$$

$$\sigma_j = \sqrt{\frac{\sum_{i=1}^{D}(z_{i,j} - \mu_j)^2}{D-1}}. \quad \text{eq. (10)}$$

After this transformation, fraud detection computing device 102 may map each sample segment $z_i$ into the standardized feature space according to:

$$z_i \rightarrow \tilde{z}_i = (\tilde{z}_{i,1}, \ldots, \tilde{z}_{i,2d}) \quad \text{eq. (11)}$$

Clustering

After feature extraction, fraud detection computing device 102 may cluster the samples using a K-Means algorithm, where the K-Means algorithm is known in the art. In order to find the optimal k, which represents the number of clusters to be used in the K-Means algorithm, for use in the K-Means algorithm, fraud detection computing device 102 executes a K-Means algorithm over a range of values. For example, an example range of k may be from 4 to 20. For each k in this range, fraud detection computing device 102 executes the K-Means algorithm r times, where r may be an integer. In some examples, r is a small integer such as 5.

Fraud detection computing device 102 may then calculate the average Silhouette value (i.e., a metric for measuring the quality of the clustering, as recognized in the art). Fraud detection computing device 102 may then identify (e.g., select) the k whose average Silhouette value (e.g., score) is the highest. For example, given a training set $Z = \{\tilde{z}_1, \ldots, \tilde{z}_D\}$, an algorithm for selecting k may be summarized, such as the selection algorithm shown below as shown.

1. let k=4;
2. let high=0;
3. for i=4, . . . ,20:
4. let score=0;
5. for j=1, . . . ,5:
6. let clusters=K−Means (Z,i);
7. let score=score+Silhouette (clusters);
8. if score >hi:
9. let k=i and high=score;
10. return k.

Once the k value has been identified, fraud detection computing device 102 may use the k value to cluster Z using the K-Means algorithm.

Anomaly Detection

Fraud detection computing device 102 may then detect anomalies based on the generated clusters. For example, assume fraud detection computing device 102 generates a set of clusters $C_1, \ldots, C_k$. Fraud detection computing device 102 identifies instances that lie outside major clusters as anomalies. In some examples, fraud detection computing device 102 generates a threshold parameter $\theta$, such as, for example, $0 \leq \theta \leq 1$, which indicates a sensitivity of the alerting system (e.g., a percentage). For example, the larger that parameter $\theta$ is, the more alerts will be generated by fraud detection system 100, as described below.

Fraud detection computing device 102 may filter out clusters whose size is less than a threshold amount, such as $\theta N$, where N is the number of training examples. For example, assume that for the set of clusters $C_1, \ldots, C_k$, fraud detection computing 102 determines that a number of the set of clusters do not include at least $\theta N$ training samples, where clusters that do include at least as $\theta N$ training samples are identified as $C_1, \ldots, C_r$. For each cluster $C_i$, we regard it as a hyperball in a 2d-dimensional space, which has center coordinates $c_i = (c_{i,1}, \ldots, c_{i,2d})$ and radius $r_i$.

Figure 7A:
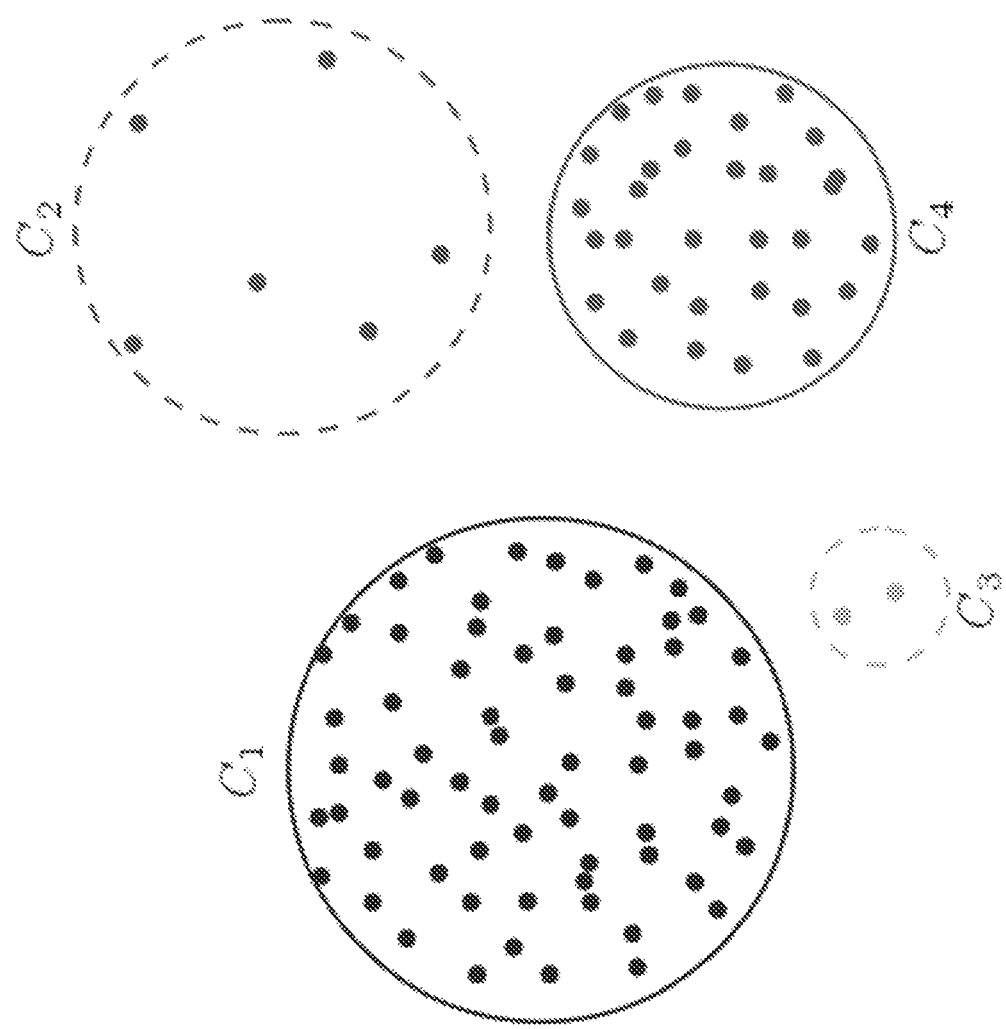
FIGS. 7A and 7B illustrate portions of clusters that may be generated by the fraud detection computing device of FIG. 1.

Take the example clusters shown in FIG. 7A for example. Assume that the K-Means algorithm in the clustering step generates four clusters, which are represented by four hyperballs, $C_1, C_2, C_3, C_4$. From the figure, we notice that $C_2$ and $C_3$ contain few data points, which, for purposes of this example, assume are below a threshold, for example, as given by $\theta N$. As such, fraud detection computing device 102 may identify $C_2$ and $C_3$ as minor clusters, and $C_1$ and $C_4$ as major clusters.

To determine whether an anomaly exists, fraud detection computing device 102 determines whether a time series, which may correspond to a training set time series in a time series bundle, maps to (e.g., is contained within) a major cluster. If the time series does not map to a major cluster, the time series is associated with an anomaly, such as a fraudulent transaction. Fraud detection computing device 102 may then generate an anomaly alert identifying the anomaly.

Figure 7B:
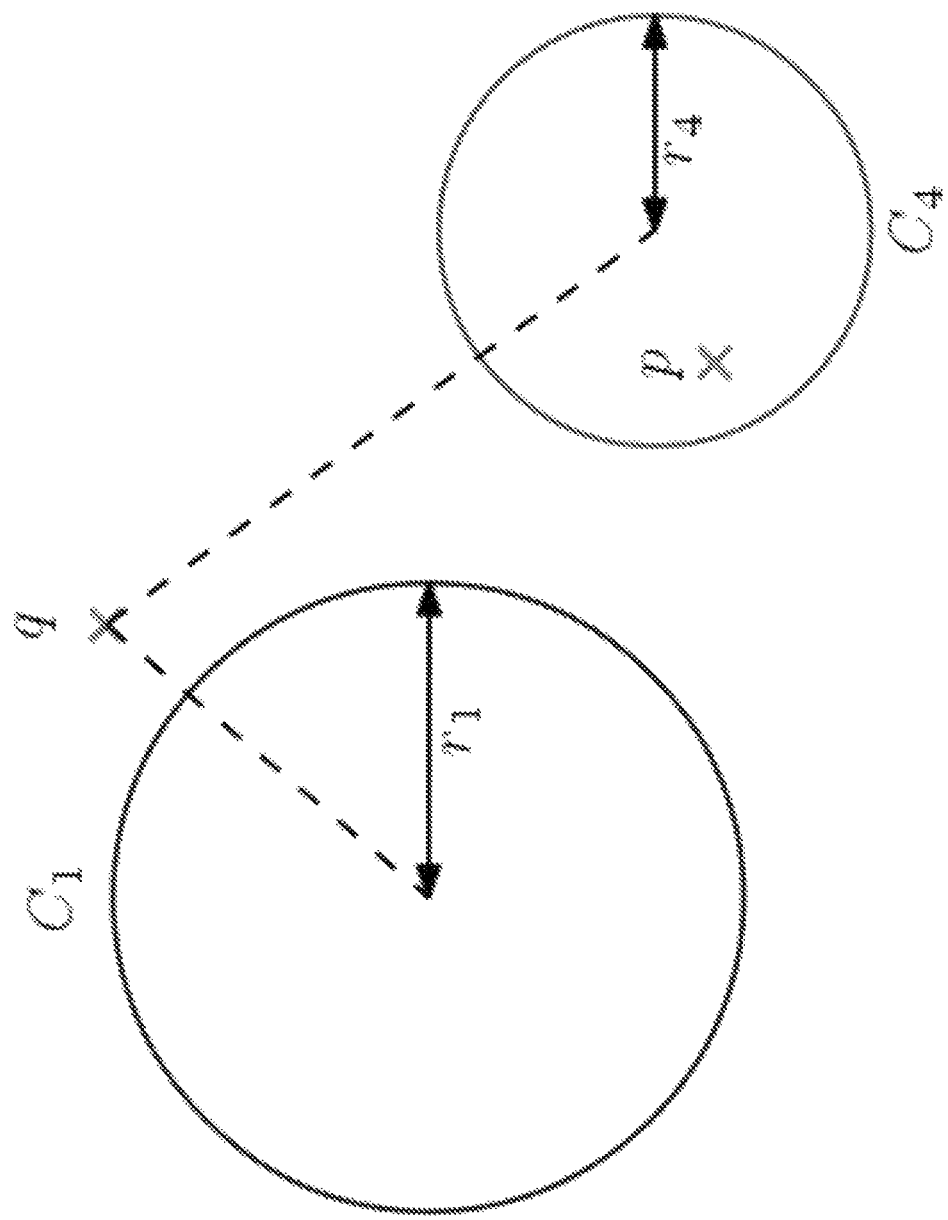

Fraud detection computing device 102 may also generate an indication of how likely a given time series is an anomaly, i.e., risk level. For example, fraud detection computing device 102 may compute the shortest distance to any one of the major clusters to determine how likely a given time series is an anomaly. For example, FIG. 7B illustrates the two major clusters, $C_1$ and $C_4$, with radius $r_1$ and $r_4$, respectively. Suppose fraud detection computing device 102 obtains two new time series p and q, as illustrated in the figure. Since p lies inside $C_4$, fraud detection computing device 102 will identify it as normal. In contrast, the data point q lies outside both major clusters, and thus fraud detection computing device 102 will identify it as an anomaly.

Suppose the distances from q to the center of $C_1$ and $C_4$ are $d_1$ and $s_4$, respectively. Fraud detection computing device 102 may compute the risk level of q according to the equation below:

$$\min(d_1 - r_1, d_4 - r_4) = d_1 - r_1 \quad \text{eq. (12)}$$

In other words, the risk level is based on the shortest distance to a major cluster. The risk level of a time series may indicate how unlikely it is to observe the event. In some examples, the higher the risk level is, the more abnormal the event is considered to be. Fraud detection computing device 102 may sort the anomaly alerts by the computed risk level.

For example, assume time series $x_i=(x_{i,1}, \ldots, x_{i,t})$ is in a same time series bundle as (e.g., corresponds with) a training data set fraud detection computing device 102 was trained with. At a time t, fraud detection computing device 102 may detect whether or not $x_i$ is an anomaly using the alerting algorithm shown below.

1. let $z=(x_{i,t-d}, \ldots, x_{i,t})$;
2. Transform z into the standardized feature space and get $\tilde{z}$;
3. let risk=∞;
4. for i=1, . . . , r:
5. let $C_i$ be the major cluster with center coordinates $c_i$ and radius $r_i$;
6. let $r=\|\tilde{z}-c_i\|_2$;
7. if $r \leq r_i$:
8. return 0;
9. let risk=min(r−$r_i$, risk);
10. return risk.

For example, if $x_i$ corresponds to a major cluster, the algorithm returns 0 indicating $x_i$ is not an anomaly. Otherwise, the algorithm may return a risk value, indicating that the time series is an anomaly associated with the returned risk value.

Figure 2:
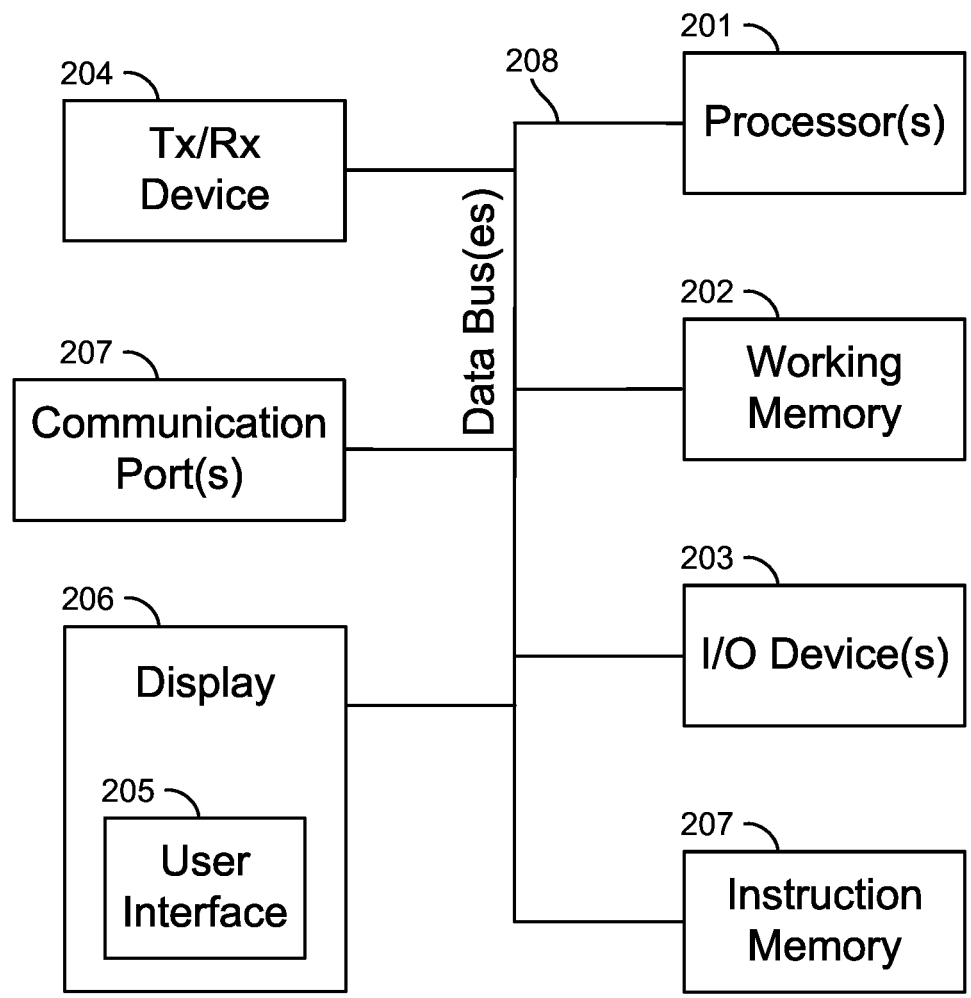
FIG. 2 is a block diagram of the fraud detection computing device of the fraud detection system of FIG. 1 in accordance with some embodiments.

FIG. 2 illustrates the fraud detection computing device 102 of FIG. 1. Fraud detection computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of fraud detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as impression data and/or engagement data.

Display 206 can display user interface 205. User interfaces 205 can enable user interaction with fraud detection computing device 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 fraud detection computing device 102 will be operating in. Processor(s) 201 is operable to receive data from, or send data to, a network, such as communication network 118 of FIG. 1, via transceiver 204.

Figure 3:
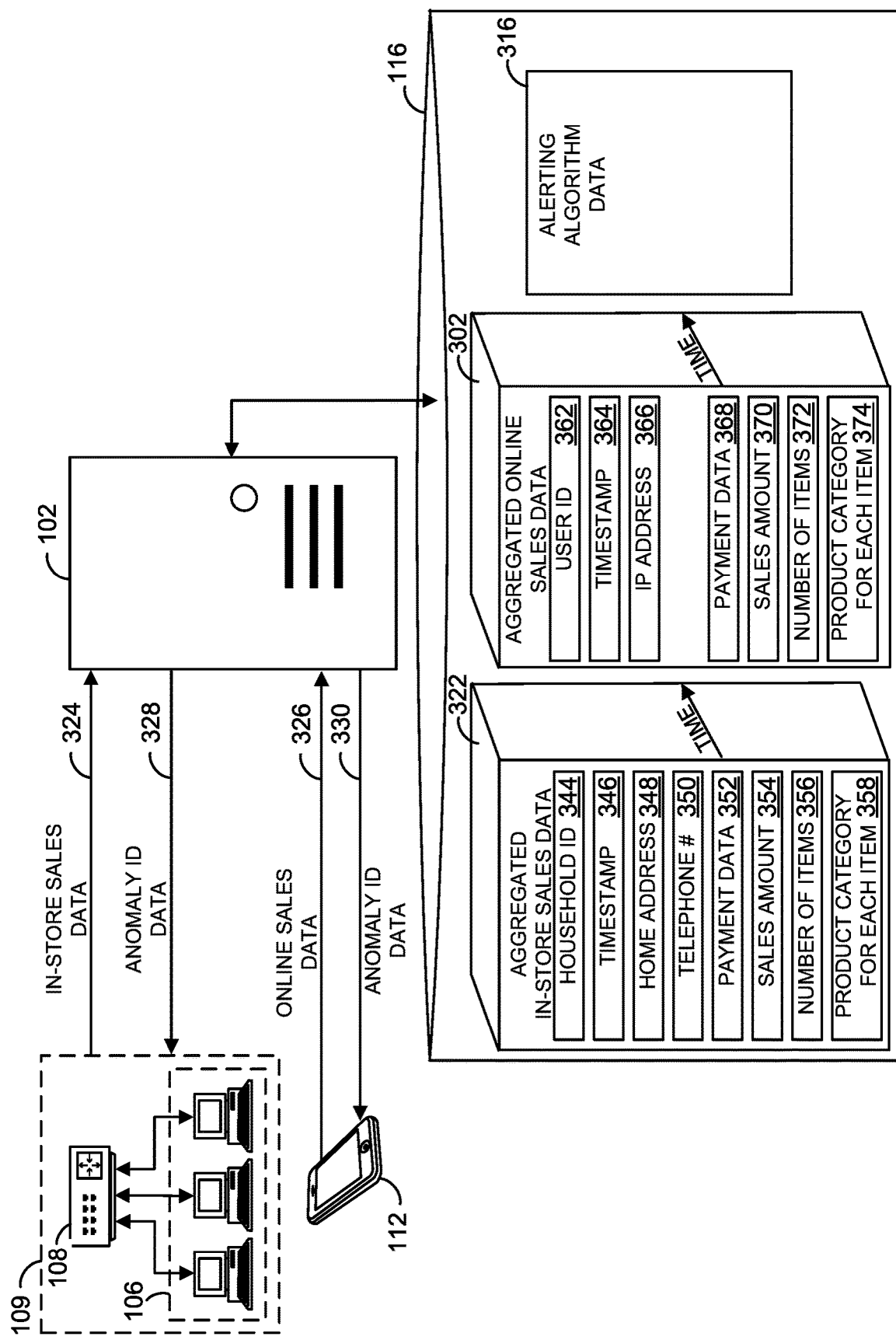
FIG. 3 is a block diagram illustrating examples of various portions of the fraud detection system of FIG. 1 in accordance with some embodiments.

FIG. 3 is a block diagram illustrating examples of various portions of the fraud detection system of FIG. 1. In this example, fraud detection computing device 102 receives from a store 109 (e.g., from a computing device, such as workstation 106, at a store location) in-store sales data 324 identifying data associated with the in-store purchase of one or more items. In-store sales data 324 may include, for example, one or more of the following: an identification of one or more items being purchased; an indication of whether a receipt has been presented; an identification of the customer (e.g., customer ID, driver's license number, a household ID, a telephone number, etc.); a sales amount (e.g., price) of each item being returned; the method of payment used to purchase the items (e.g., credit card, cash, check); an indication of whether the items are currently in stock; an indication of a time period of when the items were in stock; a product category for each item; a timestamp of when the purchase is being made; or any other data related to the items or purchase of the items.

Fraud detection computing device 102 may receive and parse in-store sales data 324, and may store the parsed data in database 116. For example, fraud detection computing device 102 may aggregate in-store sales data 324 in database 116 as aggregated in-store sales data 322, which may include in-store sales data received at various times for a plurality of customers. In this example, aggregated in-store sales data 322 may include one or more of: household ID 344; timestamp 346; home address 348; telephone number 350; payment data 352 (e.g., method of payment used to purchase the items); sales amount 354; number of items 456; and product category for each item 358.

Similarly, fraud detection computing device 102 may receive from a customer computing device 112 online sales receive data 326 identifying data associated with the online purchase of one or more items. Online sales data 326 may include, for example, one or more of the following: an identification of one or more items being purchased; an identification of the customer (e.g., customer ID, driver's license number, a user ID, a telephone number, etc.); a sales amount (e.g., price) of each item being returned; the method of payment used to purchase the items (e.g., credit card, cash, check); an indication of whether the items are currently in stock; an indication of a time period of when the items were in stock; a product category for each item; a timestamp of when the purchase is being made; an IP address associated with the purchasing device (e.g., customer computing device 112), or any other data related to the items or purchase of the items.

Fraud detection computing device 102 may receive and parse online sales data 326, and may store the parsed data in database 116. For example, fraud detection computing device 102 may aggregate online sales data 326 in database 116 as aggregated online sales data 302, which may include online sales data received at various times for a plurality of customers. In this example, aggregated online sales data 302 may include one or more of: user ID 362; timestamp 364; IP address 366; payment data 368 (e.g., method of payment used to purchase the items); sales amount 370; number of items 372; and product category for each item 374.

Based on one or more of aggregated in-store sales data 322 and/or aggregated online sales data 302, fraud detection computing device 102 may generate one or more time series, which may form all or part of a time series bundle. Based on the generated time series, fraud detection computing device 102 may generate data that identifies and characterizes clusters of feature data as described above with respect to FIG. 1. For example, fraud detection computing device 102 may perform the steps of sampling, feature extraction and standardization, and clustering based on the generated time series. Fraud detection computing device 102 may then store the generated clusters, and an algorithm that uses the generated clusters to determine anomalies, in database 116 as alerting algorithm data 316. For example, alerting algorithm data 316 may identify and characterize the clusters generated based on one or more time series, which may be generated based on one or more of aggregated in-store sales data 322 and/or aggregated online sales data 302. Alerting algorithm data 316 may also identify and characterize the alerting algorithm described above, for example.

Based on alerting algorithm data 316, fraud detection computing device 102 may identify whether a time series is associated with an anomaly, such as a fraudulent transaction. For example, fraud detection computing device 102 may receive in-store sales data 324 for a particular customer (e.g., as identified by household ID, credit card number, etc.) over a period of time, and may aggregate the in-stores sales data 324 for that customer in database 116. Fraud detection computing device 102 may generate a time series for the particular customer based on the aggregated data for that customer, and may obtain and execute the alerting algorithm identified by alerting algorithm data 316 to the generated time series. Based on the execution of the alerting algorithm, fraud detection computing device 102 may generate anomaly identification data that identifies whether the time series is associated with an anomaly. In some examples, if fraud detection computing device 102 determines that the time series is associated with an anomaly, the identification data may also identify a risk level associated with that time series. Fraud detection computing device 102 may transmit anomaly ID data 328 that includes the anomaly identification to, for example, store 109.

Similarly, fraud detection computing device 102 may receive online sales data 326 for a particular customer (e.g., as identified by user ID, IP address, etc.) over a period of time, and may aggregate the online sales data 326 for that customer in database 116. Fraud detection computing device 102 may generate a time series for the particular customer based on the aggregated data for that customer, and may obtain and execute the alerting algorithm identified by alerting algorithm data 316 to the generated time series. Based on the execution of the alerting algorithm, fraud detection computing device 102 may generate anomaly identification data that identifies whether the time series is associated with an anomaly. In some examples, if fraud detection computing device 102 determines that the time series is associated with an anomaly, the identification data may also identify a risk level associated with that time series. Fraud detection computing device 102 may transmit anomaly ID data 330 that includes the anomaly identification to, for example, customer computing device 112.

In some examples, fraud detection computing device 102 may receive one or more of in-store sales data 324 and/or online sales data 326, and determine, in real-time, whether the in-store sales data 324 and/or online sales data 326 is associated with an anomaly. For example, fraud detection computing device 102 may aggregate currently received in-store sales data 324 with previously received in-store sales data for the same customer, generate one or more time series based on the aggregated sales data for the customer, and determine whether an anomaly exists based on execution of the alerting algorithm identified by alerting algorithm data 316. Similarly, fraud detection computing device 102 may aggregate currently received online sales data 326 with previously received online sales data for the same customer, generate one or more time series based on the aggregated sales data for the customer, and determine whether an anomaly exists based on execution of the alerting algorithm identified by alerting algorithm data 316.

Figure 4:
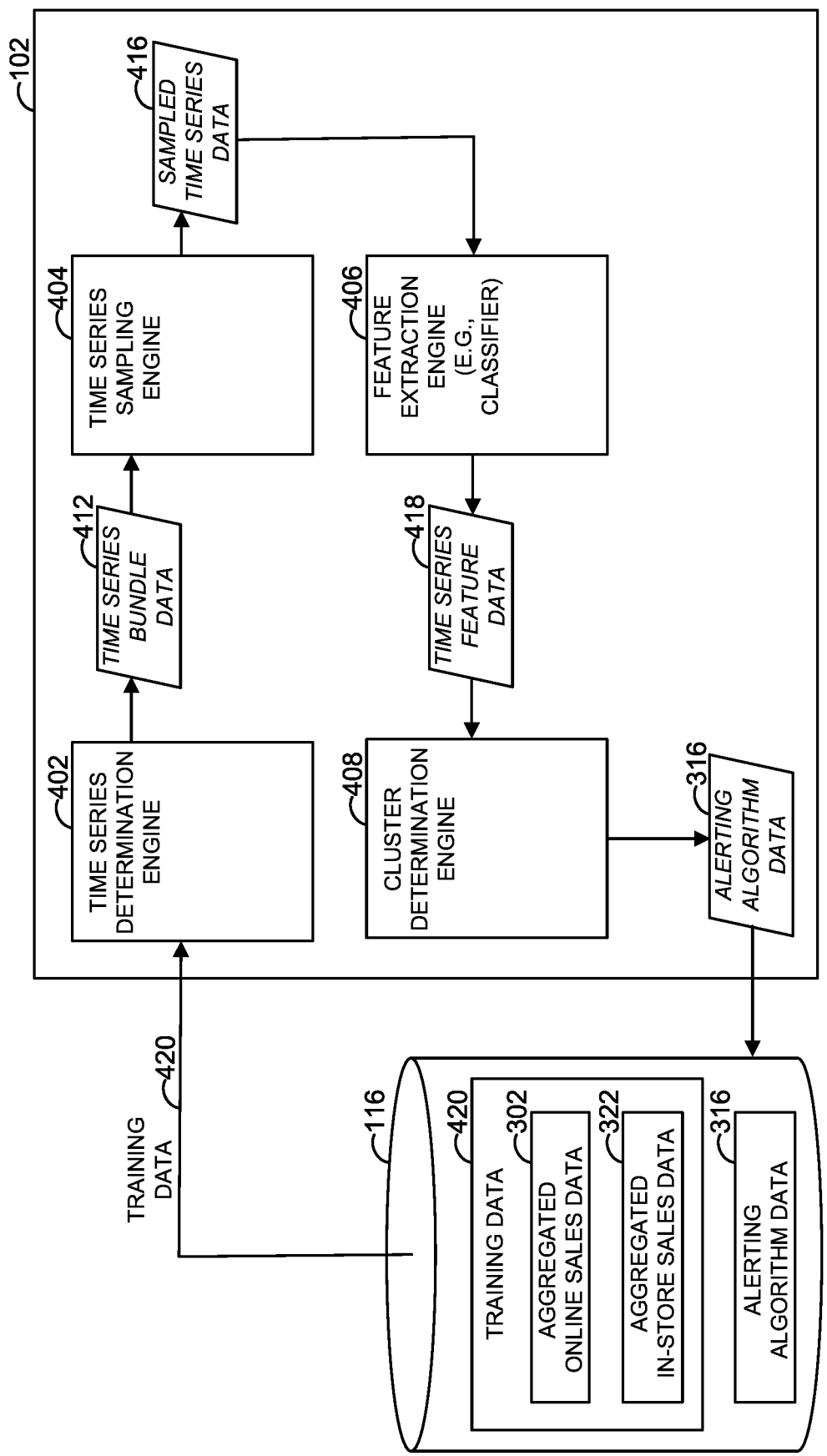
FIG. 4 is a block diagram illustrating examples of various portions of the fraud detection computing device of FIG. 1 in accordance with some embodiments.

FIG. 4 is a block diagram illustrating examples of various portions of the fraud detection computing device 102 of FIG. 1. As indicated in the figure, fraud detection computing device 102 includes time series determination engine 402, time series sampling engine 404, feature extraction engine 406, and cluster determination engine 408. In some examples, one or more of fraud detection computing device 102 includes time series determination engine 402, time series sampling engine 404, feature extraction engine 406, and cluster determination engine 408 may be implemented in hardware. In some examples, one or more of fraud detection computing device 102 includes time series determination engine 402, time series sampling engine 404, feature extraction engine 406, and cluster determination engine 408 may be implemented as an executable program maintained in a tangible, non-transitory memory, such as instruction memory 207 of FIG. 2, that may be executed by one or processors, such as processor 201 of FIG. 2.

Time series determination engine 402 may be operable to obtain training data 420, which may include aggregated online sales data 302 and/or aggregated in-store sales data 322, and determine time series bundle data 412 identifying one or more time series of a time series bundle. For example, each time series may identify purchases made with a particular credit card over a time period, where all of the time series together identify all purchases made over that time period.

Time series sampling engine 404 may obtain time series bundle data 412, and sample time series bundle data 412 to determine a subset. For example, time series sampling engine 404 may execute the sampling algorithm described above to determine a subset of time series bundle data 412, namely, sampled time series data 416. In some examples, the hyperparameter d may be provided by a user of fraud detection computing system 102, such as via user interface 205 using I/O device 203.

Feature extraction engine 406 may be a classifier, such as one based on a supervised learning algorithm such as Logic Regression, Support Vector Machines, Random Forest, Gradient Boosting Machines, or any other suitable learning algorithm (e.g., machine learning algorithm) and feature engineering techniques. Feature extraction engine 406 may obtain sampled time series data 416 and generate features for each segment identified in sampled time series data 416. For example, feature extraction engine 406 may generate the features based on the execution of equations 5, 6, and 7. Feature extraction engine 406 may further standardize the features, such as by removing the mean and dividing by the standard deviation of the features. For example, feature extraction engine 406 may standardize the features based on the execution of equations 8, 9, and 10, to generate sampled segments. Feature extraction engine 406 may then map each sample segment into the standardized feature space according to equation 11. Feature extraction engine 406 may generate time series feature data 418, which identifies and characterizes the sampled segments.

Cluster determination engine 408 may obtain time series feature data 418, and generate clusters, such as major clusters. For example, cluster determination engine 408 may determine the clusters based on the execution of one or more K-Means algorithms to determine an optimal value k for use in the K-Means algorithm, such as the selection algorithm described above, and based on the optimal value k, execute the K-Means algorithm using the determined optimal value k to cluster the sampled segments.

Based on the determined clusters, cluster determination engine 408 may determine which of the clusters are major clusters. Cluster determination engine 408 may identify the major clusters based on determining which clusters have a size larger than or equal to a threshold, such as θN, where N is the number of training samples. The major clusters will have at least the threshold number of training samples.

Based on the determined major clusters, cluster determination engine may generate an alerting algorithm, such as the algorithm identified above, to identify time series that may be associated with an anomaly. Cluster determination engine 408 may store alerting algorithm data 316, identifying and characterizing the alerting algorithm, in database 116.

Figure 5:
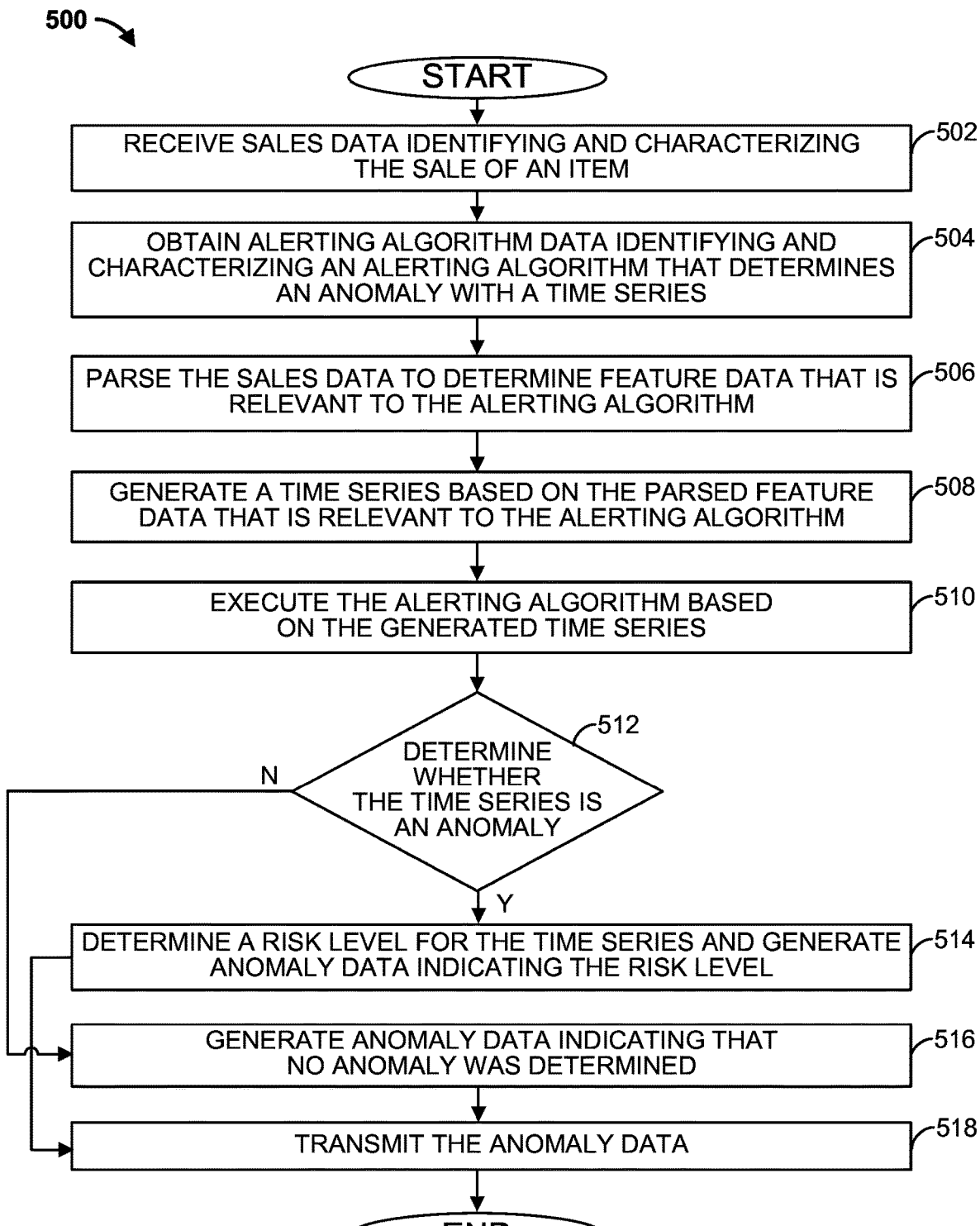
FIG. 5 is a flowchart of an example method that can be carried out by the fraud detection system 100 of FIG. 1 in accordance with some embodiments.

FIG. 5 is a flowchart of an example method 500 that can be carried out by the fraud detection system 100 of FIG. 1. Beginning at step 502, a computing device, such as fraud detection computing device 102, receives sales data, such as in-store sales data 324, identifying and characterizing the sale of an item. The in-store sales data may be received, for example, from store 109. At step 504, the computing device obtains alerting algorithm data, such as alerting algorithm data 316 from database 116, identifying and characterizing an alerting algorithm that determines an anomaly with a time series. Proceeding to step 506, the sales data is parsed to determine feature data that is relevant to the alerting algorithm. At step 508, a time series is generated based on the parsed feature data that is relevant to the alerting algorithm.

At step 510, the alerting algorithm is executed based on the generated time series. Based on the execution of the alerting algorithm, at step 512 a determination is made as to whether the time series is associated with an anomaly. If the time series is associated with an anomaly, the method proceeds to step 514, where fraud detection computing device 102 may generate data indicating that the time series is an anomaly and an associated risk level. The risk level may be computed, for example, by the execution of the alerting algorithm defined above. The method then proceeds to step 518. Otherwise, if the time series is not associated with an anomaly, the method proceeds to step 516 where fraud computing device 102 generates anomaly data indicating that the time series is not associated with an anomaly. The method then proceeds to step 518. At step 518, the anomaly data is transmitted. For example, the anomaly data may be transmitted to store 109.

Figure 6:
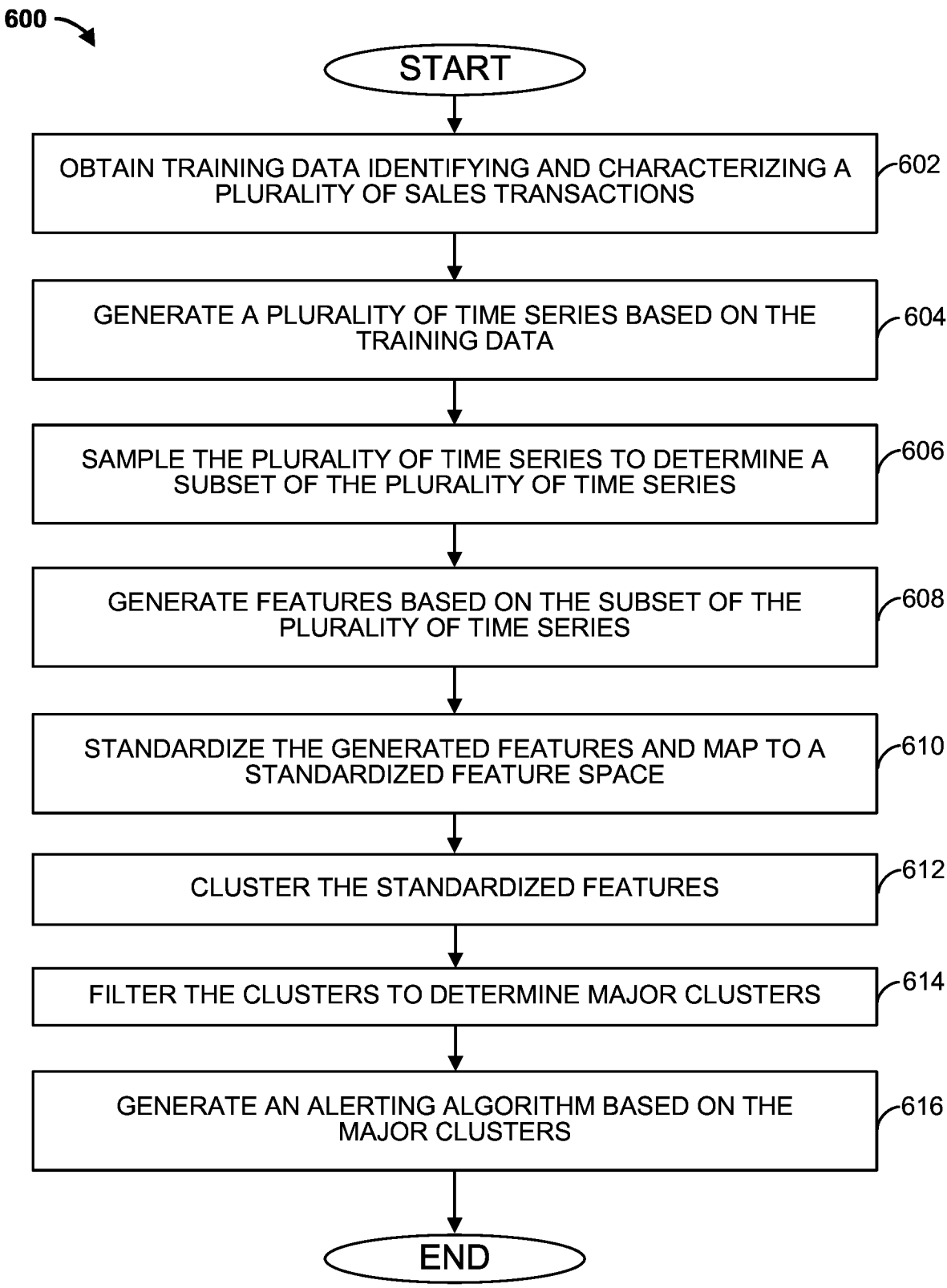
FIG. 6 is a flowchart of another example method that can be carried out by the fraud detection system 100 of FIG. 1 in accordance with some embodiments.

FIG. 6 is a flowchart of another example method 600 that can be carried out by the fraud detection system 100 of FIG. 1. At step 602, a computing device, such as fraud detection computing device 102, obtains training data identifying and characterizing a plurality of sales transactions. For example, fraud detection computing device 102 may obtain training data 420 from database 116. At step 604, a plurality of time series are generated based on the training data. For example, fraud detection computing device 102 may generate a training data set $X=\{x_1, \ldots, x_m\}$, where each $x_i=(x_{j,1}, \ldots, x_{j,n})$ is a time series with n timestamps. At step 606, the plurality of time series are sampled to determine a subset of the plurality of time series. For example, fraud detection computing device 102 may execute the sampling algorithm described above to determine the subset of the plurality of time series.

Proceeding to step 608, features are generated based on the subset of the plurality of time series. For example, given a segment $z=(z_0, z_d)$ in the subset of the plurality of time series, fraud detection computing device 102 may determine features based on the execution of equations 5, 6, and 7. At step 610, the features are standardized and mapped to a standardized feature space. For example, fraud detection computing device may standardize the features based on the execution of equations 8, 9, 10, and 11. At step 612, the standardized features are clustered. For example, fraud detection computing device 102 may determine an optimal K-Means algorithm to execute based on the execution of the selection algorithm described above. Fraud detection computing device 102 may then execute the optimal K-Means algorithm to cluster the standardized features. Proceeding to step 614, the clusters are filtered to determine major clusters. For example, to determine the major clusters, fraud detection computing device 102 may filter out, from the generated clusters, small clusters whose size is less than θN, where N is the number of training samples. At step 616, an alerting algorithm is generated based on the major clusters. For example, fraud detection computing device 102 may generate data identifying and characterizing the alerting algorithm defined above, and may store the alerting algorithm data in database 116.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a memory device; and
   a computing device communicatively coupled to the memory device and configured to:
   receive sales data identifying a plurality of sale transactions;
   generate at least one time series based on the received sales data;
   generate features based on the at least one time series;
   map the features to a feature space;
   generate clusters of feature data based on the mapped features;
   filter the clusters of feature data to determine a plurality of major clusters;
   generate alerting data based on the plurality of major clusters,
   wherein the alerting data maps the clusters of feature data to risk data;
   determine that the time series is associated with an anomaly based on the alerting data;
   generate an alert identifying the anomaly;
   transmit the anomaly to a user device; and
   store the alerting data in the memory device.

2. The system of claim 1, wherein generating the at least one time series comprises:
   generating a plurality of time series based on the received sales data; and
   sampling the plurality of time series to generate the at least one time series.

3. The system of claim 2, wherein sampling the plurality of time series comprises generating a set of segments of a predetermined length randomly from the plurality of time series.

4. The system of claim 3, wherein generating the features is based on the set of segments.

5. The system of claim 1, wherein generating the features comprises standardizing the features based on their values.

6. The system of claim 1, wherein filtering the clusters of feature data comprises determining a subset of the clusters of feature data with a size less than a threshold, and filtering out the subset of the clusters of feature data.

7. The system of claim 1, wherein mapping the clusters of feature data to risk data comprises associating the plurality of major clusters with no anomalies.

8. The system of claim 7, wherein the computing device is configured to:
   determine, for a received time series, a distance to each of the plurality of major clusters; and
   determine whether the received time series is an anomaly based on the distances.

9. The system of claim 8, wherein the computing device is configured to:
   determine, based on the distances, that the received time series is not within the plurality of major clusters; and
   determine that the received time series is an anomaly based on the determination that the received time series is not within the plurality of major clusters.

10. The system of claim 8, wherein the computing device is configured to:
    determine, based on the distances, that the received time series is within at least one of the plurality of major clusters; and
    determine that the received time series is not an anomaly based on the determination that the received time series is within the at least one of the plurality of major clusters.

11. A method by at least one processor, the method comprising:
    receiving sales data identifying a plurality of sale transactions;
    generating at least one time series based on the received sales data;
    generating features based on the at least one time series;
    mapping, by the processor, the features to a feature space;
    generating, by the processor, clusters of feature data based on the mapped features;
    filtering, by the processor, the clusters of feature data to determine a plurality of major clusters;
    generating alerting data based on the plurality of major clusters, wherein the alerting data maps the clusters of feature data to risk data;
    determining that the time series is associated with an anomaly based on the alerting data;
    generating an alert identifying the anomaly;
    transmitting the anomaly to a user device; and
    storing the alerting data in the memory device.

12. The method of claim 11, wherein generating the at least one time series comprises:
    generating a plurality of time series based on the received sales data; and
    sampling the plurality of time series to generate the at least one time series.

13. The method of claim 12, wherein sampling the plurality of time series comprises generating a set of segments of a predetermined length randomly from the plurality of time series.

14. The method of claim 13, wherein generating the features is based on the set of segments.

15. The method of claim 11, wherein generating the features comprises standardizing the features based on their values.

16. The method of claim 11, wherein filtering the clusters of feature data comprises determining a subset of the clusters of feature data with a size less than a threshold, and filtering out the subset of the clusters of feature data.

17. The method of claim 11, wherein mapping the clusters of feature data to risk data comprises associating the plurality of major clusters with no anomalies.

18. A non-transitory computer readable medium having instructions stored thereon, wherein the instructions, when executed by at least one processor, cause a device to perform operations comprising:

receiving sales data identifying a plurality of sale transactions;

generating at least one time series based on the received sales data;

generating features based on the at least one time series;

mapping the features to a feature space;

generating clusters of feature data based on the mapped features;

filtering the clusters of feature data to determine a plurality of major clusters;

generating alerting data based on the plurality of major clusters, wherein the alerting data maps the clusters of feature data to risk data;

determining that the time series is associated with an anomaly based on the alerting data;

generating an alert identifying the anomaly;

transmitting the anomaly to a user device; and storing the alerting data in the memory device.

19. The non-transitory computer readable medium of claim 18 comprising further instructions stored thereon that, when executed by at least one processor, further cause the device to perform operations comprising:

generating a plurality of time series based on the received sales data; and sampling the plurality of time series to generate the at least one time series.

20. The non-transitory computer readable medium of claim 18 comprising further instructions stored thereon that, when executed by at least one processor, further cause the device to perform operations comprising:

generating a set of segments of a predetermined length randomly from the plurality of time series; and generating the features is based on the set of segments.

* * * * *